United States Patent [19]
Kim

[11] Patent Number: 6,018,588
[45] Date of Patent: Jan. 25, 2000

[54] IMAGE ENHANCEMENT CIRCUIT AND METHOD USING MEAN MATCHING/QUANTIZED MEAN MATCHING HISTOGRAM EQUALIZATION AND COLOR COMPENSATION

[75] Inventor: Yeong-taeg Kim, Suwon, Rep. of Korea

[73] Assignee: Samsung Electronics Co., Ltd., Kyungki-do, Rep. of Korea

[21] Appl. No.: 08/947,899

[22] Filed: Oct. 9, 1997

[30] Foreign Application Priority Data

Oct. 9, 1996 [KR] Rep. of Korea ...... 96-44919
Oct. 9, 1996 [KR] Rep. of Korea ...... 96-44921

[51] Int. Cl.[7] .................. G06K 9/00; G06K 9/40
[52] U.S. Cl. ............. 382/167; 382/168; 382/254; 382/274
[58] Field of Search ............ 282/168, 169, 282/167, 274, 254; 348/671, 672, 631; 358/518, 520, 521, 522, 525, 447, 455, 461

[56] References Cited

U.S. PATENT DOCUMENTS 5,345,277  9/1994  Blankevoort et al. ............ 348/679
5,862,254  1/1999  Kim et al. ............................ 382/168

*Primary Examiner*—Blian Tadayon
*Assistant Examiner*—Dmitry A. Novik
*Attorney, Agent, or Firm*—Sughrue, Mion, Zinn, Macpeak & Seas, PLLC

[57] ABSTRACT

In an image enhancement method and circuit, a luminance signal is extracted from input color signals. Histogram equalization is performed using a cumulative density function of the extracted luminance signal which is input in a screen unit. A transform function is controlled to map a mean level of the extracted luminance signal to itself, so that an adjusted luminance signal is output. The color signals are varied according to the variation of the luminance signals to output compensated color signals. Thus, image contrast is enhanced, and an undistorted color signal is provided at the same time. In order to reduce the hardware of the circuit, an interpolated cumulative density function is obtained by interpolating a quantized cumulative density function of an input luminance image and is used as a transform function. The transform function is controlled to map a mean level of the input luminance image to itself.

27 Claims, 7 Drawing Sheets

IMAGE ENHANCEMENT CIRCUIT AND METHOD USING MEAN MATCHING/ QUANTIZED MEAN MATCHING HISTOGRAM EQUALIZATION AND COLOR COMPENSATION

BACKGROUND OF THE INVENTION

The present invention relates to image enhancement, and more particularly, to a method and apparatus for enhancing the quality of an image by compensating a color signal in response to a luminance variation or adjustment due to mean matching histogram equalization and quantized mean matching histogram equalization.

The basic operation of histogram equalization is to transform a given input image on the basis of its histogram, wherein the histogram represents the density of a gray level distribution of an input image. The histogram of the gray level distribution provides an overall depiction of the appearance of an image. A gray level properly controlled according to a sample distribution of an image enhances the appearance or contrast of the image.

Among various methods for contrast enhancement, histogram equalization is widely known and has been disclosed in the following documents: [1] J. S. Lim, "Two-Dimensional Signal and Image Processing," Prentice Hall, Englewood Cliffs, N.J., 1990; and [2] R. C. Gonzalez and P. Wints, "Digital Image Processing," Addison-Wesley, Reading, Mass., 1977.

The well-known characteristics of histogram equalization act as a defect in some practical cases. For example, since the output density of histogram equalization is constant, the mean brightness of an output image approaches a middle gray level. As a result, the mean brightness of an output image in histogram equalization is exactly the middle gray level regardless of the mean brightness of the input image. This characteristic is not desirable for certain applications such as in photographed night scenes. Because the histogram equalization provides an output at the middle region of the gray levels, a scene photographed at night appears extremely bright after histogram equalization.

Additionally, if color compensation is not performed on a color signal according to a luminance variation produced by histogram equalization, a pure color signal is distorted.

For instance, in a color system that is composed of signals Y, R-Y and B-Y, it is assumed that the signal Y is; transformed into a signal Y' (=Y+Δy) by a predetermined luminance processing. The adjusted signals Y', R-Y and B-Y are varied into values R, G and B without color compensation, and the resultant color signals are expressed by Equations (1) through (3):

$$R' = (R - Y) + Y' \quad (1)$$
$$= R + \Delta y$$

$$G' = (G - Y) + Y' \quad (2)$$
$$= G + \Delta y$$

$$B' = (B - Y) + Y' \quad (3)$$
$$= B + \Delta y.$$

When Y is transformed into Y', an exemplary pure red signal (R,0,0) is mapped to a signal (R+Δy, Δy, Δy) if there is no color compensation. Thus, the resultant color signal is no longer a pure red signal. Similarly, if there is no color compensation, all of the other pure color signals are also distorted.

Meanwhile, a contrast correction method for extracting Y from input color signals R, G and B, extracting a correction signal from the extracted Y, and adding th.e correction signal to the respective input signals R, G and B as shown in Equations (1) through (3), has been disclosed in an U.S. Pat. No. 5,345,277. Even in the above-described patent document, a pure color signal is distorted.

SUMMARY OF THE INVENTION

To solve the above problems, it is an object of the present invention to provide a method for enhancing the image quality by varying a color signal based on the adjusted luminance, while enhancing image contrast by controlling a cumulative density function of an input luminance image used as a transform function to map a mean level of the luminance image to itself.

It is another object of the present invention to provide a method for enhancing the image quality by varying a color signal based on an adjusted luminance, while enhancing image contrast by controlling an interpolated cumulative density function obtained by interpolating a quantized cumulative density function of an input luminance image, used as a transform function to map a mean level of the input luminance image to itself during histogram equalization.

It is still another object of the present invention to provide a circuit for enhancing the image quality toy varying a color signal based on an adjusted luminance, while enhancing image contrast by controlling a cumulative density function of an input luminance image used as a transform function to map a mean level of the luminance image to itself.

It is yet another object of the present invention to provide a circuit for enhancing the image quality by varying a color signal based on an adjusted luminance, while enhancing image contrast by controlling an interpolated cumulative density function obtained by interpolating a quantized cumulative density function of an input luminance image, used as a transform function to map a mean level of the input luminance image to itself during histogram equalization.

To accomplish the first object, there is provided an image enhancement method comprising the steps of: extracting a luminance signal from input color signals; performing histogram equalization using a cumulative density function of the extracted luminance signal as a transform function, and outputting an adjusted luminance signal by controlling the transform function to map a mean level of the extracted luminance signal to itself; and varying the input color signals based on the adjusted luminance signal, and outputting compensated color signals.

To accomplish the second object, in the adjusted luminance signal outputting step, a quantized cumulative density function of the extracted luminance signal is histogram-equalized using an interpolated cumulative density function as a transform function, and the adjusted luminance signal is output by controlling the transform function to map a mean level of the extracted luminance signal to itself.

To accomplish the third object, in an image enhancement circuit, an extractor extracts a luminance signal from input color signals, a histogram equalizer performs histogram equalization using a cumulative density function of the extracted luminance signal as a transform function, and outputs an adjusted luminance signal by controlling the transform function to map a mean level of the extracted luminance signal to itself, and a color compensator outputs compensated color signals by varying the input color signals based on the adjusted luminance signal.

To accomplish the fourth object, the histogram equalizer performs histogram equalization using an interpolated cumulative density function obtained by interpolating a quantized cumulative density function of the extracted luminance signal as a transform function, and outputs an adjusted luminance signal by controlling the transform function to map a mean level of the extracted luminance signal to itself.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

First, a mean matching histogram equalization method according to an embodiment of the present invention will be described.

$\{X\}$ denotes a given luminance image, and $X_m$ denotes a mean level of the given luminance image $\{x\}$.

The given luminance image $\{X\}$ is composed of N discrete gray levels $\{X_0, X_1, \ldots, X_{L-1}\}$, wherein $X_0=0$ denotes a black level, and $X_{L-1}=1$ denotes a white level. Also, $X_m \in \{X_0, X_1, \ldots, X_{L-1}\}$.

The probability density function (PDF) is defined as follows:

$$p(X_k) = \frac{n_k}{n}, \text{ for } k = 0, 1, \ldots, L-1 \qquad (4)$$

wherein $n_k$ denotes the number of times a gray level $X_k$ appears in a luminance image $\{X\}$, and n is the number of total samples of the luminance image $\{X\}$. At this time, the cumulative density function (CDF) is defined by following Equation:

$$c(X_k) = \sum_{j=0}^{k} p(X_j) \qquad (5)$$

On the basis of the cumulative density function, the output $Y_t$ of general histogram equalization with respect to a given luminance image is expressed as follows:

$$Y_t = c(X_k)X_{L-1} \qquad (6)$$

The most serious problem of histogram equalization is that the mean brightness between input and output signals can be remarkably varied according to the cumulative density function which is used as a transform function.

To solve such a problem, the present invention proposes the following mapping operation based on the mean of an input luminance image in combination with a cumulative density function.

$$Y' = \begin{cases} \dfrac{c(X_k)}{c(X_m)}X_m, & \text{if } X_k \leq X_m \\ X_m + (X_{L-1} - X_m)\dfrac{c(X_k) - c(X_m)}{1 - c(X_m)}, & \text{if } X_k > X_m \end{cases} \qquad (7)$$

An input sample smaller than or equal to the mean level $X_m$ is mapped to a gray level ranging from $X_0$ to $X_m$ by a transform function $$\frac{c(X_k)}{c(X_m)}X_m,$$

and an input sample greater than the mean level $X_m$ is mapped to a gray level ranging from $X_m$ to $X_{L-1}$ by a transform function $$X_m + (X_{L-1} - X_m)\frac{c(X_k) - c(X_m)}{1 - c(X_m)}.$$

It can be seen from Equation (7) that $X_m$ is mapped back to $X_m$.

Accordingly, histogram equalization is performed on a given image according to the calculated cumulative density function, a large variation in mean brightness of the given image does not occur by controlling the transform function based on the cumulative density function as shown in Equation (7) to map a mean level of the given image back to itself. A method for preventing a large variation in the mean brightness of a given image during histogram equalization is denoted as mean matching histogram equalization in the present invention.

A quantized mean matching histogram equalization method will now be described.

An original discrete L-level input signal having levels $\{X_0, X_1, \ldots, X_{L-1}\}$ is quantized to Q discrete levels which is defined as $\{Z_0, Z_1, \ldots, Z_{Q-1}\}$, wherein it is assumed that $Z_{Q-1}$ is equal to $X_{L-1}$, q is smaller than or equal to L, and $\{Z_0, Z_1, \ldots, Z_{Q-1}\} \subset \{X_0, X_1, \ldots, X_{L-1}\}$.

Figure 1:
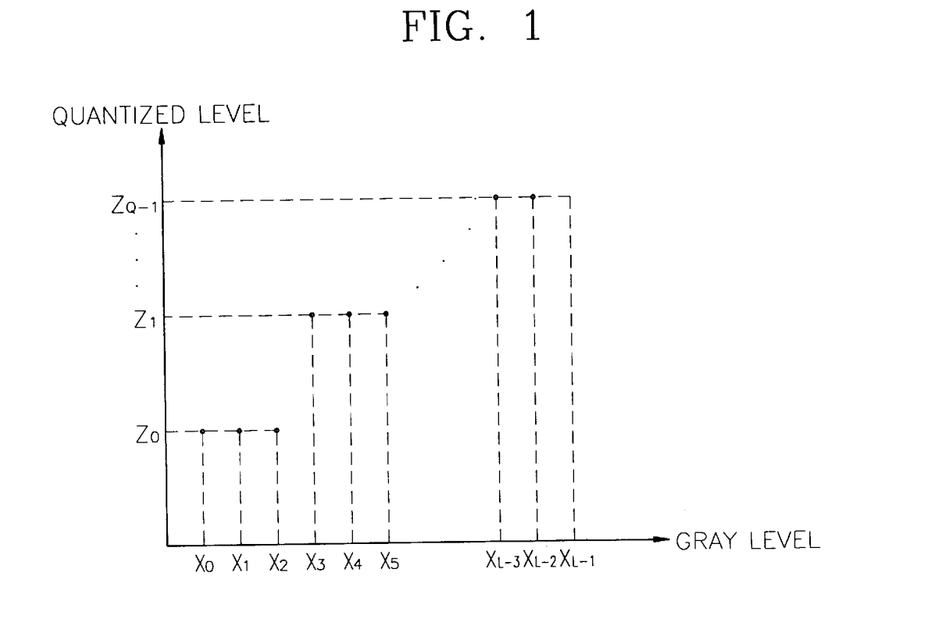
FIG. 1 shows an example of quantization of an L-level discrete signal into a Q-level discrete signal, for explaining the concept of quantization.

An example of the quantization of an L-level discrete signal to a Q-level discrete signal is shown in FIG. 1.

Also, $Q[\{X_k\}]$ represents a quantizing operation, and defined as follows:

$$Q[X_k]=Z_q,$$

if $Z_{q-1} < X_k \leq Z_q$.

When $\{Z\}$ is equal to $Q[\{X\}]$, $\{Z\}$ denotes a quantized image.

The probability density function (PDF) of the quantized image $\{Z\}$ can be expressed by Equation (8):

$$P(Z_q) = \frac{N_q}{N}, \qquad (8)$$

wherein $P(Z_q)$ is the probability of a q-th quantization gray level $Z_q$ in the quantized image $\{Z\}$, $N_q$ is the number of times in which the level $Z_q$ appears in the quantized image $\{Z\}$, and N denotes the number of total samples of the quantized image $\{Z\}$.

At this time, the cumulative density function (CDF) of the quantized image $\{Z\}$ is defined as shown in Equation (9):

$$C(Z_q) = \sum_{j=0}^{q} P(Z_j), \qquad (9)$$

wherein $C(Z_{Q-1})$ is equal to 1.

Figure 2:
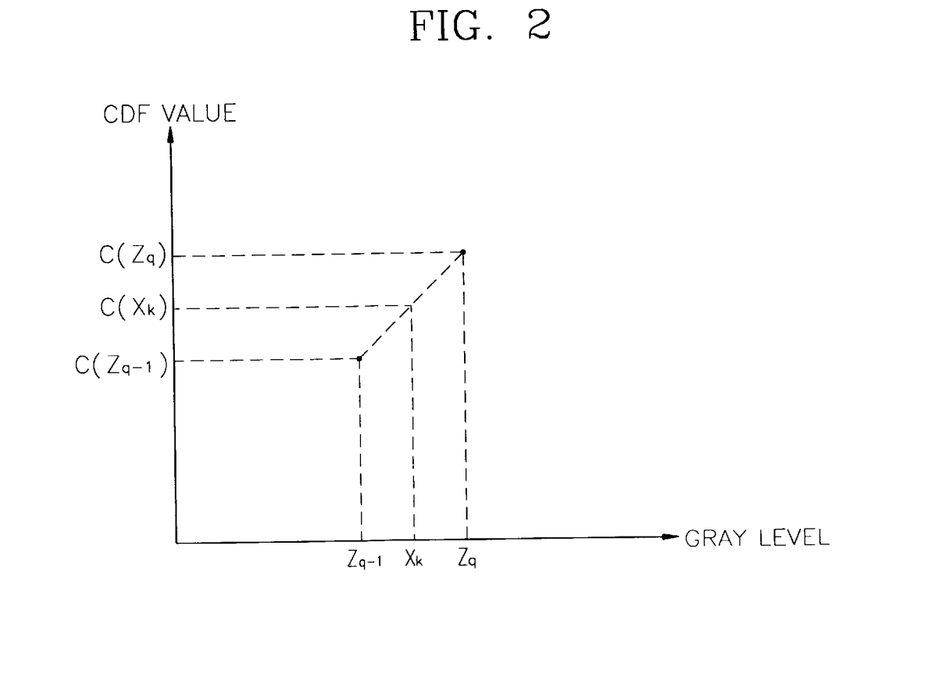
FIG. 2 is a view for explaining the concept of interpolation with respect. to a quantized cumulative density function.

The cumulative density function $c(X_k)$ of unquantized samples can be approximately calculated by linear interpolation as shown in FIG. 2 using the cumulative density function $C(Z_q)$ of quantized samples.

When $Q[X_k]$ is $Z_q$, assuming that $Z_{-1}$ is 0, $c(X_k)$ is linearly interpolated as shown in Equation (10):

$$c(X_k) = C(Z_{q-1}) + [C(Z_q) - C(Z_{q-1})]\frac{X_k - Z_{q-1}}{Z_q - Z_{q-1}}. \qquad (10)$$

Using the above Equation (10), $c(X_m)$ can be approximately obtained.

Also, the present invention proposes the following mapping operation based on the mean of an input luminance image in combination with the cumulative density function obtained by linear interpolation.

$$Y' = \begin{cases} \frac{c(X_k)}{c(X_m)} X_m, & \text{if } X_k \leq X_m \\ X_m + (X_{L-1} - X_m)\frac{c(X_k) - c(X_m)}{1 - c(X_m)}, & \text{if } X_k > X_m \end{cases} \qquad (11)$$

An input sample smaller than or equal to the mean level $X_m$ is mapped to a gray level ranging from $X_0$ to $X_m$ by a transform function $$\frac{c(X_k)}{c(X_m)} X_m,$$

and an input sample greater than the mean level $X_m$ is mapped to a gray level ranging from $X_{m+1}$ to $X_{L-1}$ by a transform function $$X_m + (X_{L-1} - X_m)\frac{c(X_k) - c(X_m)}{1 - c(X_m)}.$$

It can be seen from Equation (11) that $X_m$ is mapped back into $X_m$.

Accordingly, when histogram-equalization is performed on a given image according to a cumulative density function calculated by linearly interpolating a quantized cumulative density function, the mean brightness of the given image does not vary by controlling the transform function based on an interpolated cumulative density function as shown in Equation (11) to map a mean level of the given image back into itself. That is, a method for preventing the variation in the mean brightness of a given image during histogram equalization is denoted a quantized mean-matching histogram equalization in the present invention.

Figure 3:
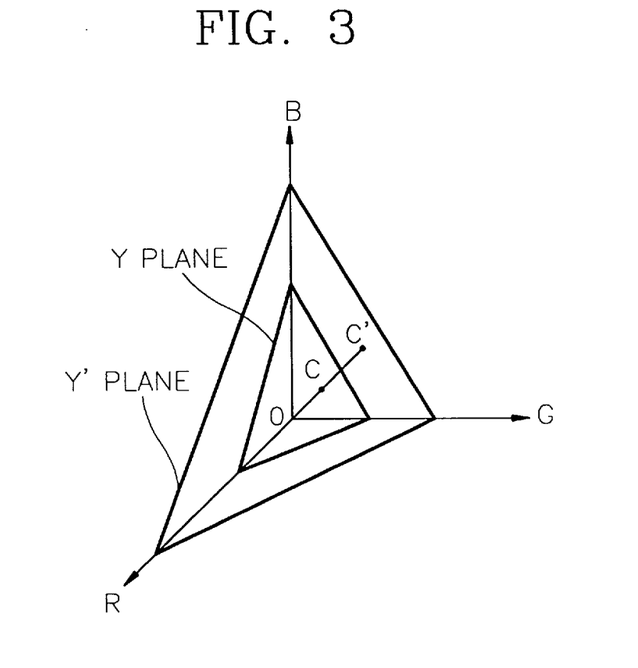
FIG. 3 is a view for explaining color compensation depending on a luminance variation, according to the present invention.

A color compensation method based on a luminance signal adjusted by mean matching histogram equalization and quantized mean-matching histogram equalization will now be described with reference to FIGS. 3 and 4.

C is given as (R, G, B) and Y, and it is assumed that Y is transformed into Y' by mean-matching histogram equalization or by quantized mean-matching histogram equalization. Here, color signals R, G and B can be converted into various different color signals such as color systems (Y,I,Q), (Y,U,V) and (Y,R-Y,B-Y), according to a signal manner.

The relationship between the color signals R, G and B and new color signals Y, U and V can be expressed by Equation (12):

$$\begin{bmatrix} Y \\ U \\ V \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} R \\ G \\ B \end{bmatrix} \qquad (12)$$

Here, $a_{ij}$ is a coefficient.

Meanwhile, the basic concept of color compensation according to the present invention is the fact that a given color is varied in the direction of the color in a (R,G,B) space.

First, Y can be expressed by $a_{11}R+a_{12}G+a_{13}B$ using Equation (12), and signals R, G and B having constant. values Y form a plane on the (R,G,B) space. In other words, all of the color signals placed on the plane with Y being $a_{11}R+a_{12}G+a_{13}B$, have the identical luminance values. A variation in luminance from Y to Y' implies the movement of a given color C onto a Y' plane as shown in FIG. 3. Here, in the present invention, it is assumed that colors C and C' have the identical color directions, which means that the orientation or direction of a line OC accords with thee orientation of a line OC'. Thus, the compensated color C' on the Y' plane is obtained by searching for an intersection point between the line OC and the Y' plane. To sum up, the original color signal C shown in FIG. 3 is mapped to the signal C' when the Y plane is placed on the Y' plane. The point C' is an intersection point between the line OC and the Y' plane.

Now, in order to obtain the color signal C', l, m and n are defined as directional cosines of the given color signal C. Relationships for l, m, and n are expressed by Equation (13):

$$l = R/r, \ m = G/r, \ n = B/r \qquad (13),$$

wherein r equals $\sqrt{R^2+G^2+B^2}$.

Similarly, directional cosines l', m' and n' of the output color signal C' being (R', G', B') can be expressed by Equation (14):

$$l' = R'/r', \ m' = G'/r', \ n' = B'/r' \qquad (14),$$

wherein r' equals $\sqrt{R'^2+G'^2+B'^2}$. In order to allow the two color signals C and C' to have an identical color direction, relationships such as Equation (15) or (16) should be established:

$$l=l', \ m=m', \ n=n' \qquad (15)$$

$R'/r'=R/r, G'/r'=G'/r, B'/r'=B/r$ (16).

Accordingly, $$R' = \frac{r'}{r}R \tag{17}$$

$$G' = \frac{r'}{r}G \tag{18}$$

$$B' = \frac{r'}{r}B, \tag{19}$$

when the relationships of Equations (17), (18) and (19) are substituted in $Y'=a_{11}R'+a_{12}G'+a_{13}B'$, Equations (20), (21) and (22) are established:

$$Y' = a_{11}\frac{r'}{r}R + a_{12}\frac{r'}{r}G + a_{13}\frac{r'}{r}B \tag{20}$$

$$= \frac{r'}{r}(aR + bG + cB) \tag{21}$$

$$= \frac{r'}{r}Y \tag{22}$$

Therefore, a result such as Equation (23) is obtained:

$$\frac{Y'}{Y} = \frac{r'}{r}. \tag{23}$$

This result means that the ratio of a variation in luminance is equal to that of a variation in color, the present invention performs color compensation by varying a is color value according to a variation in luminance.

Meanwhile, Equations (17) to (19) can be expressed by Equations (24) to (26) using the result of Equation (23).

$$R' = \frac{Y'}{Y}R \tag{24}$$

$$G' = \frac{Y'}{Y}G \tag{25}$$

$$B' = \frac{Y'}{Y}B \tag{26}$$

Consequently, c' can be expressed as follows:

$$C' = (R', G', B') \tag{27}$$

$$= (kR, kG, kB), \tag{28}$$

wherein k equals Y'/Y, a ratio between the original luminance signal and the resultant luminance signal after histogram equalization.

Color compensation of other color systems can be also easily performed using the result of Equation (28). For example, a given (Y,U,V) signal should be converted into a (kY,kU,kV) signal as shown in Equations (29) through (34) using the result of color compensation given by Equation (28):

$$U' = a_{21}R' + a_{22}G' + a_{23}B' \tag{29}$$

$$= k(a_{21}R + a_{22}G + a_{23}B) \tag{30}$$

$$= kU, \tag{31}$$

and $$V' = a_{31}R' + a_{32}G' + a_{33}B' \tag{32}$$

$$= k(a_{31}R + a_{32}G + a_{33}B) \tag{33}$$

$$= kV. \tag{34}$$

Next, color compensation is further considered to prevent color saturation due to the above-described color compensation.

Figure 4:
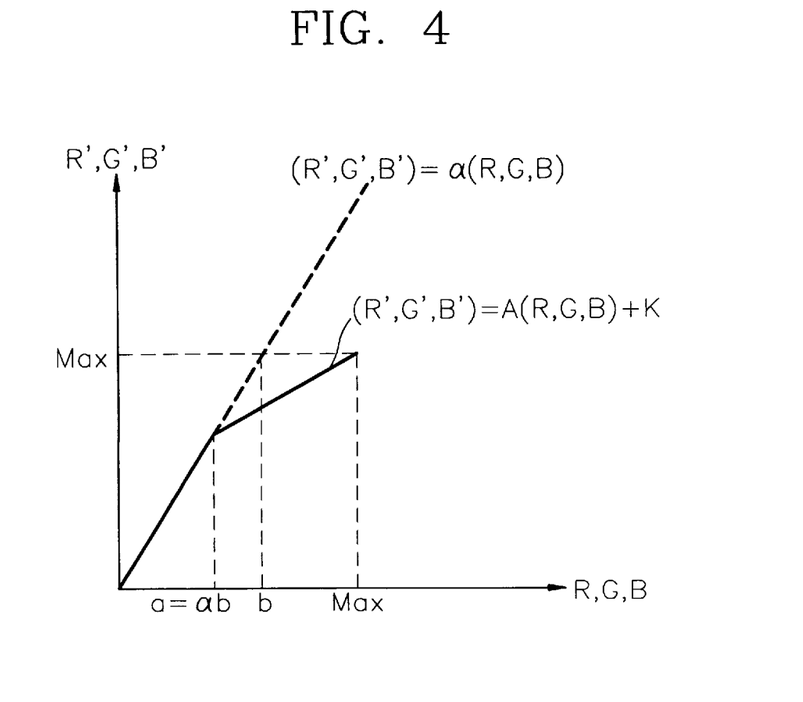
FIG. 4 is a view for showing a color compensation line for preventing color saturation.

When the ratio of luminance is given as k, and when color compensation is performed using the compensation line (R', G', B')=k(R,G,B) shown in FIG. 4, color signals between a b(=Max/k) level and a maximum (MAX) level are compensated to a maximum value (MAX) of the color signal, which implies saturation of the color signal. This is because when color signals between the b level and the MAX level are compensated by the above-described compensation method, the color signals are consequently mapped to the maximum value and are not discriminated from each other.

To prevent the color saturation, a compensation line (R', G', B')=k(R,G,B) approximates a compensation line (R', G', B')=A(R,G,B)+K, for the color signals between an a(=αb) level and a maximum (Max) level. Here, α is greater than or equal to 0 and smaller than or equal to 1, and A and K can be expressed by Equations (35) and (36):

$$A = \frac{k(1-\alpha)}{k-1} \tag{35}$$

$$K = \frac{(k-1)\alpha}{k-1}Max \tag{36}$$

Hereinafter, preferred embodiments of an imaige enhancement circuit using mean matching/quantized mean matching histogram equalization and color compensation, according to the present invention, will be described with reference to FIGS. 5 through 12.

Figure 5:
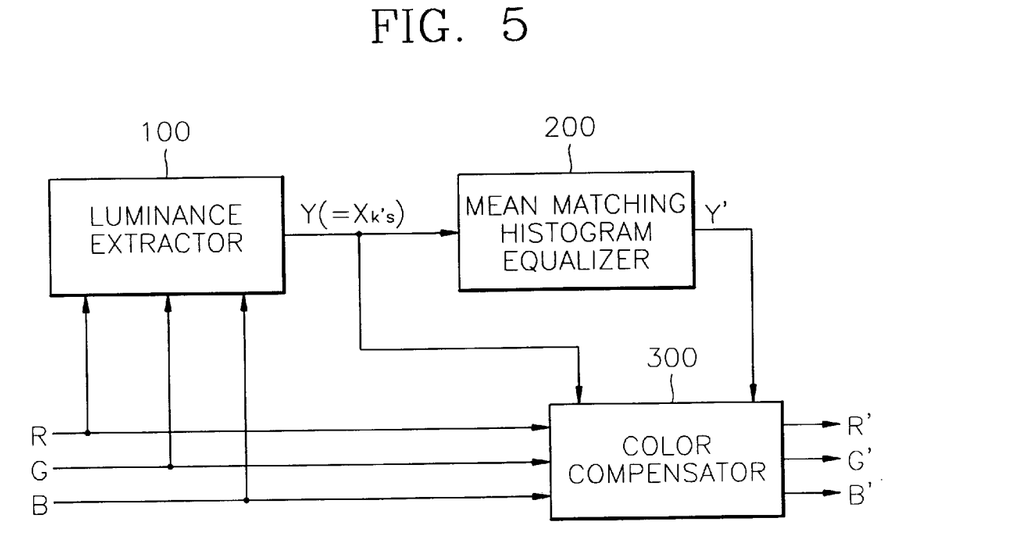
FIG. 5 is a block diagram of an image enhancement circuit according to an embodiment of the present invention.

FIG. 5 is a block diagram of an image enhancement circuit according to an embodiment of the present invention. Referring to FIG. 5, a luminance extractor 100 extracts a luminance signal Y from input signals R, G, and B. Here, the luminance extractor can comprise a matrix circuit. A mean matching histogram equalizer 200 histogram-equalizes the luminance signal Y extracted by the luminance extractor 100 using a cumulative density function of the extracted luminance signal Y as a transform function, and outputs an adjusted luminance signal Y' by controlling the transform function to map a mean level of the extracted luminance signal Y to itself. A color compensator 300 multiplies the ratio k between the luminance signal Y output by the luminance extractor 100 and the varied luminance signal Y' output by the mean matching histogram equalizer 200 with the respective input color signals R, G and B, and outputs compensated color signals R', G' and B'.

Figure 6:
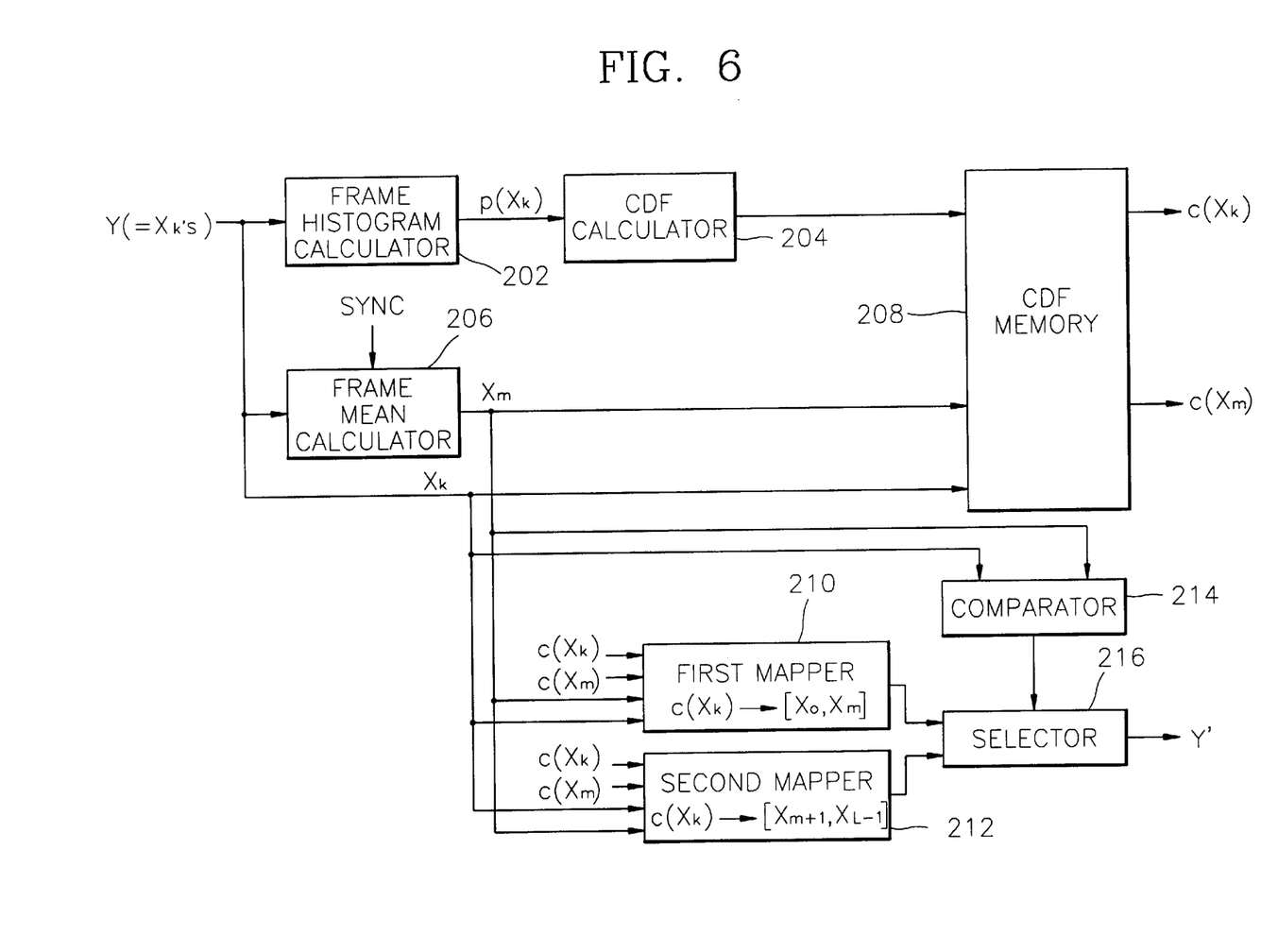
FIG. 6 is a detailed block diagram of the mean matching histogram equalizer shown in FIG. 5.

FIG. 6 is a detailed block diagram of the mean matching histogram equalizer 200 shown in FIG. 5. Referring to FIG. 6, a frame histogram calculator 202 calculates a probability density function $p(X_k)$ using Equation (4) by calculating a gray level distribution with respect to an input luminance image ($Y=X_k$'s) in a scree:n unit. Here, the screen unit can be a field, but is set as a frame in the present embodiment, and k is an integer between 0 and L−1

A CDF calculator 204 calculates a cumulative density function c ($X_k$) using Equation (5) on the basis of the probability density function p($X_k$) of one frame calculated by the frame histogram calculator 202. A frame mean calculator 206 calculates a mean level $X_m$ of the luminance image (Y=$X_k$'s) input in a frame unit. The frame mean calculator 206 outputs the mean level $X_m$, calculated in a frame unit, to a CDF memory 208 and first and second mappers 210 and 212 according to a synchronous signal (SYNC).

The CDF memory 208 renews the cumulative density function c($X_k$) calculated by the CDF calculator 204 in frame units according to the synchronous signal SYNC, and outputs a cumulative density function value c($X_k$) corresponding to an input luminance signal $X_k$ from a cumulative density function of a prior frame stored during renewal and a mean cumulative density function value c($X_m$) with respect to the mean level $X_m$ output by the frame mean calculator 206.

The first mapper 210 inputs the cumulative density function value c($X_k$) and the cumulative density function value c($X_m$) with respect to the mean level which are output by the CDF memory 208, the mean level $X_m$ output by the frame mean calculator 206, and the input luminance signal $X_k$, and outputs a contrast-enhanced signal, i.e., an adjusted luminance signal Y' by mapping the input luminance signal $X_k$ having a level smaller than or equal to the mean level $X_m$ to a gray level ranging from $X_0$ to $X_m$ using Equation (7).

The second mapper 212 inputs the cumulative density function value c($X_k$) and the cumulative density function value c($X_m$) with respect to the mean level which are output by the CDF memory 208, the mean level $X_m$ output by the frame mean calculator 206, and the input luminance signal $X_k$, and outputs a contrast-enhanced signal, i.e., an adjusted luminance signal Y' by mapping the input luminance signal $X_k$ having a level greater than or equal to the mean level $X_m$ to a gray level ranging from $X_m$ to $X_{L-1}$ using Equation (7).

At this time, the luminance signal $X_k$ input to the first and second mappers 210 and 212 is a frame next to that corresponding to the cumulative density function value output by the CDF memory 208. Accordingly, a frame memory for delaying an input luminance signal by one frame can be further provided to input the luminance signal, having the same frame as a frame corresponding to the cumulative density function value output by the CDF memory 208, to the first and second mappers 210 and 212. However, in the present invention, hardware is reduced by omitting the frame memory which is possible due to the high correlation between adjacent frames.

A comparator 214 generates a selection control signal by comparing the input luminance signal $X_k$ with the mean level $X_m$ output by the frame mean calculator 206. A selector 216 selects the first mapper 210 when the input luminance signal $X_k$ is smaller than or equal to the mean level $X_m$, and otherwise, selects the second mapper 212, according to the selection control signal.

Here, the frame histogram calculator 202 and the CDF calculator 204 need not be formed separately, and can be. constituted as one block for calculating the density of a gray level distribution with respect to the input luminance image in a screen unit and calculating a CDF on the basis of the result.

Figure 7:
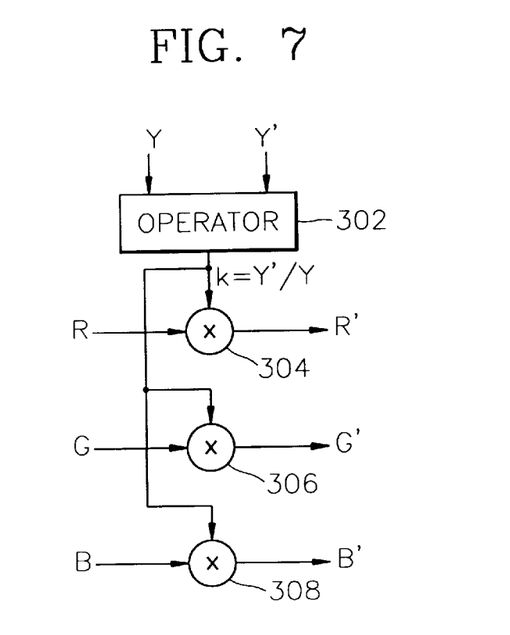
FIG. 7 is a detailed circuit diagram of the color compensator shown in FIG. 5.

FIG. 7 is a detailed circuit diagram of the color compensator 300 shown in FIG. 5. Referring to FIG. 7, an operator 302 produces a ratio k between the luminance signal Y output by the luminance extractor 100 of FIG. 5 and the adjusted luminance signal Y' output by the mean matching histogram equalizer 200, i.e., Y'/Y. Here, the operator can be a divider. First through third multipliers 304 through 308 multiply the ratio k output by the operator 302 by each of the input signals R, G and B, and output: compensated signals R', G' and B'.

Figure 8:
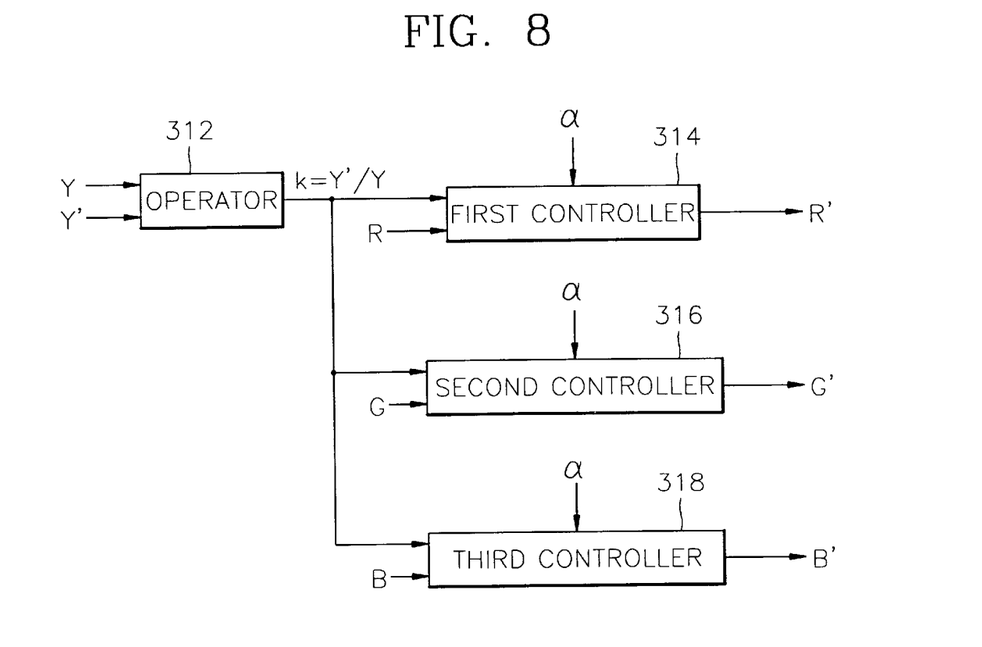
FIG. 8 is another detailed circuit diagram of the color compensator shown in FIG. 5.

FIG. 8 is another embodiment for the circuit diagram of the color compensator 300 shown in FIG. 5. Referring to FIG. 8, an operator 312 produces a ratio k between the luminance signal Y output by the luminance extractor 100 of FIG. 3 and the adjusted luminance signal Y' output by the mean matching histogram equalizer 200, i.e., Y'/Y.

First through third controllers 314 through 318 are for compensating the input signals R, G and B using the approximated compensation line shown in FIG. 4 to prevent color saturation. The first controller 314 receives the input signal R, the ratio k output by the operator 312 and a parameter α. Controller 314 outputs a signal R' compensated by a compensation line (R', G', B')=k(R,G,B) when the input signal R is between a minimum level and an a(=αb) level as shown in FIG. 4, and outputs a signal R' compensated by a compensation line (R', G', B')=A(R,G,B)+K when the input signal R is between the a level and a maximum (Max) level.

At this time, the input signals R, G and B can be selectively compensated by the compensation line (R', G', B')=k(R,G,B) or by the approximated compensation line (R', G', B')=A(R,G,B)+K, according to the value of the parameter α. That is, when α is 1, the input signals R, G and B are compensated by the compensation line (R', G', B')=k(R,G, B). When α is 0, the input signals R, G and B are compensated by the approximated compensation line (R', G', B')= A(R,G,B)+K. When α is greater than 0 and smaller than 1, the input signals are compensated by the compensation line (R', G', B')=k(R,G,B) between the minimum. level and the a(=αb) level, and compensated by the approximated compensation line (R', G', B')=A(R,G,B)+K between the a level and the maximum (Max) level.

The second controller 314 receives the input signal G, the ratio k output by the operator 312 and a parameter α, and outputs a signal G' compensated by a compensation line (R', G', B')=k(R,G,B) when the input signal G is between a minimum level and an a(=αb) level as shown in FIG. 4, and outputs a signal G' compensated by a compensation line (R', G', B')=A(R,G,B)+K when the input signal G is between the a level and a maximum (Max) level.

The third controller 318 receives the input signal B, the ratio k output by the operator 312 and a parameter α, and outputs a signal B' compensated by a compensation line (R', G', B')=k(R,C,B) when the input signal B is between a minimum level and an a(=αb) level as shown in FIG. 4, and outputs a signal B' compensated by a compensation line (R', G', B')=A(R,G,B)+K when the input signal B is between the a level and a maximum (Max) level.

Figure 9:
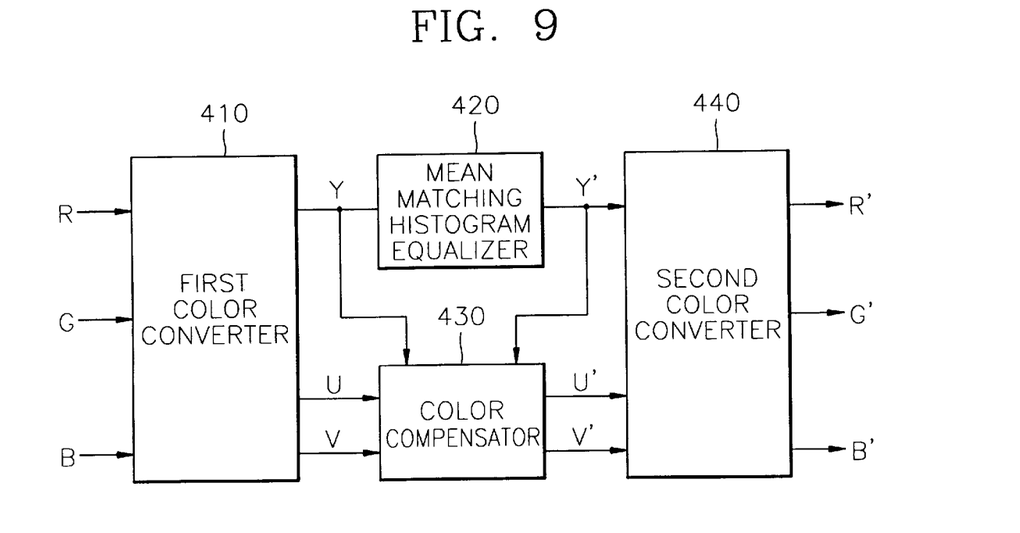
FIG. 9 is a block diagram of an image enhancement circuit according to another embodiment of the present invention.

FIG. 9 is a block diagram of an image enhancement circuit according to another embodiment of the present invention. Referring to FIG. 9, a first color converter 410 receives base-band digital color signals indicated by R, G and B and converts a digital luminance signal into system-defined color signals which are indicated by Y, U and V.

Here, the signals R, G and B can be converted into various different color signals such as color systems (Y,I,Q), (Y,U,V) and (Y,R-Y,B-Y) according to a signal manner. In the present invention, for example, (Y,U,V) is defined as a color system, Y denotes a luminance signal, and U and V denote system-defined color signals. The relationship between the signals R, G and B and the new, color signals Y,U and V can be expressed by Equation (12).

A mean matching histogram equalizer 420 performs histogram equalization using a cumulative density function of the luminance signal Y output by the first color converter 410 as a transform function, and outputs an adjusted luminance signal Y' by controlling the transform function to map a mean level of the luminance signal to itself. Here, the detailed configuration of the mean matching histogram equalizer 420 is the same as that of the equalizer shown in FIG. 6.

A color compensator 430 receives the luminance signal Y output by the first color converter 410 and the adjusted luminance signal Y' output by the mean matching histogram equalizer 420, varies the color signals U and V output by the first color converter 410 so that the color signals U and V are varied in the same ratio as the variation of the luminance signal, and outputs compensated system-defined color signals U' and V'. Here, the color compensator 430 may output system-defined color signals U' and V' compensated using the configuration shown in FIGS. 7 and 8.

A second color converter 440 receives the varied luminance signal Y' output by the mean matching histogram equalizer 420 and the compensated system-defined color signals U' and V' output by the color compensator 430, performs an inverse-conversion opposite to the conversion performed by the first color converter 410, and outputs resultant color signals R'G' and B'.

That is, the resultant color signals R', G' and B' are obtained by inverse conversion of the signals Y', U' and V' into a color system (R,G,B) using the relationship shown in Equation (37):

$$\begin{bmatrix} R' \\ G' \\ B' \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} Y' \\ U' \\ V' \end{bmatrix} \quad (37)$$

Figure 10:
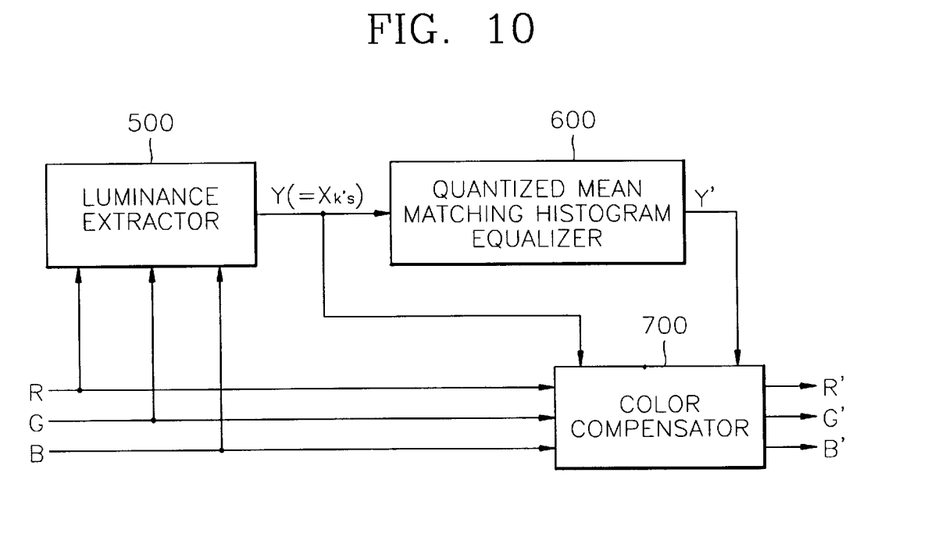
FIG. 10 is a block diagram of an image enhancement circuit according to still another embodiment of the present invention.

FIG. 10 is a block diagram of an image enhancement circuit according to still another embodiment of the present invention. Referring to FIG. 10, a luminance extractor 500 extracts a luminance signal Y from input. signals R, G and B. A quantized mean matching histograms equalizer 600 outputs an adjusted luminance signal Y' by controlling a transform function to map a mean level of an input luminance image to itself, when histogram equalization is performed on a quantized cumulative density function of the luminance signal Y extracted by the luminance extractor 500, using an interpolated cumulative density function as the transform function. A color compensator 700 outputs compensated color signals R', G' and B' by multiplying a ratio k between the luminance signal Y output by the luminance extractor 500 and the adjusted luminance signal Y' output by the quantized mean matching histogram equalizer 600 with the respective color signals R, G and B.

Figure 11:
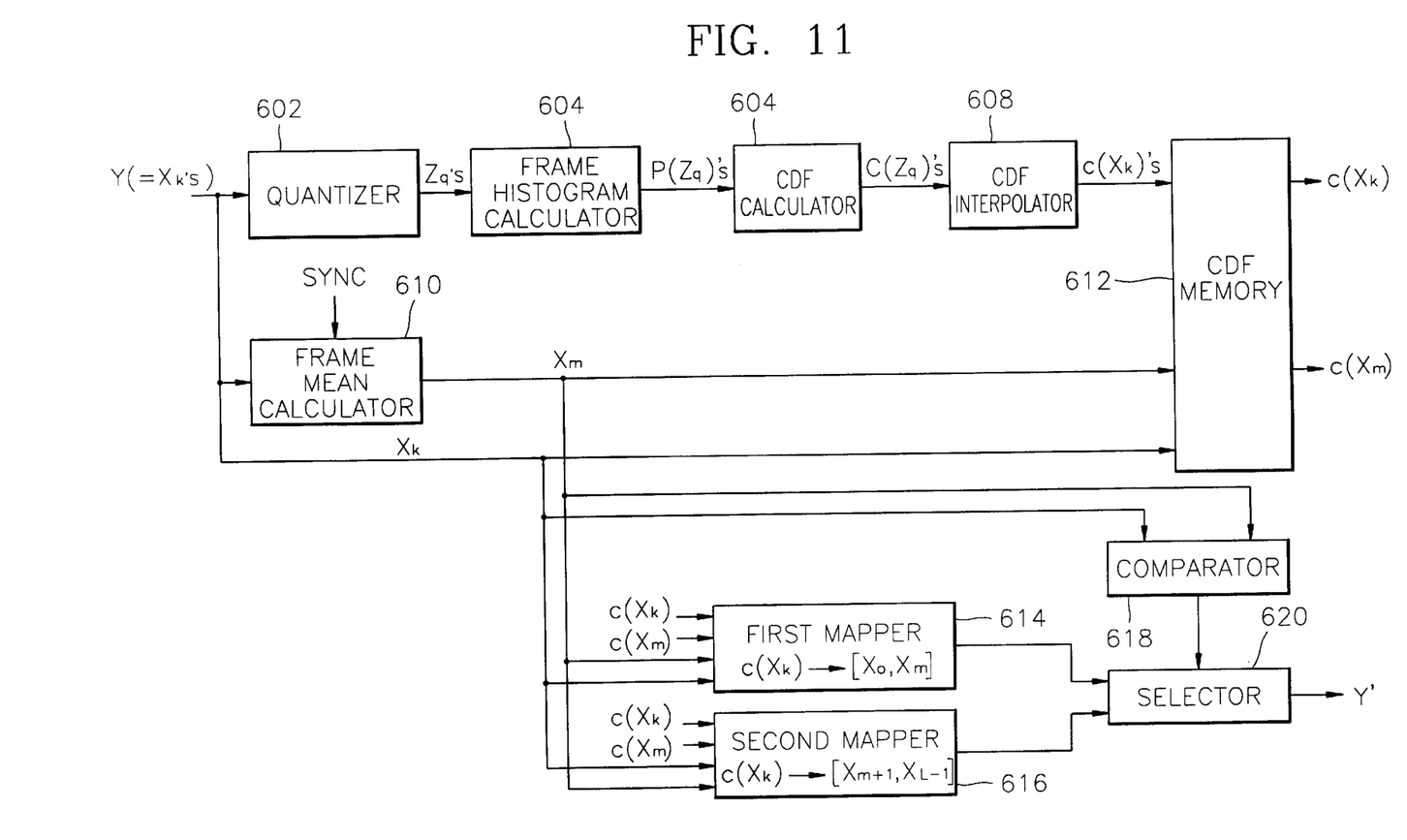
FIG. 11 is a detailed block diagram of the quantized mean matching histogram equalizer shown in FIG. 10.

FIG. 11 is a detailed block diagram of the quantized mean matching histogram equalizer 600 shown in FIG. 10. Referring to FIG. 11, a quantizer 602 quantizes a luminance image (Y=$X_k$'s) having L levels into Q levels and outputs a quantized image $Z_q$'s. A frame histogram calculator 604 calculates a gray level distribution with respect to the quantized image $Z_q$'s in a screen unit and calculates a probability density function P($Z_q$)'s using Equation (8).

A CDF calculator 606 calculates a quantized cumulative density function C($Z_q$)'s using Equation (9) on the basis of the probability density function P($Z_q$)'s of the quantized image ($Z_q$'s) calculated by the frame histogram calculator 604. A CDF interpolator 608 performs a linear interpolation on the basis of the cumulative density function C($Z_q$)'s of the quantized image ($Z_q$'s) using Equation (10), and outputs an interpolated cumulative density function c($X_k$)'s. Here, k is an integer ranging from 0 to L−1.

Meanwhile, a frame mean calculator 610 calculates a mean level $X_m$ of a luminance image (Y=$X_k$'s) of a frame unit, and outputs the mean level $X_m$ calculated according to a synchronous signal SYNC to a CDF memory 612 and first and. second mappers 614 and 616. The CDF memory 612 renews the cumulative density function c($X_k$)'s, interpolated by the CDF interpolator 608, in a frame unit according to a SYNC signal, and outputs an interpolated cumulative density function value c($X_k$) stored during renewal and a cumulative density function value c ($X_m$) with respect to the mean level $X_m$ output by the frame mean calculator 610. Here, the CDF memory 612 is used as a buffer.

The first mapper 614 receives the interpolated cumulative density function value c($X_k$) and the cumulative density function value c($X_m$) with respect to a mean level which are output by the CDF memory 612, the mean level $X_m$ output by the frame mean calculator 610 and the input luminance signal $X_k$, and maps the input luminance signal $X_k$ having a level smaller than or equal to the mean level $X_m$ to, a gray level ranging from $X_0$ to $X_m$ using Equation (11).

The second mapper 616 receives the interpolated cumulative density function value c($X_k$) and the cumulative density function value c($X_m$) with respect to a mean level which are output by the CDF memory 612, the mean level $X_m$ output by the frame mean calculator 610 and the input luminance signal $X_k$, and maps the input luminance signal $X_k$ having a level greater than the mean level $X_m$ to a gray level ranging from $X_{m+1}$ to $X_{L-1}$ using Equation (11).

In order to input a signal having the same frame as that of the interpolated cumulative density function value c($X_k$) input to the first and second mappers 614 and 616, the input luminance signal $X_k$ can be delayed by one frame by a frame memory. However, the present invention omits the frame memory in consideration of the fact that a high correlation exists between adjacent frames, so that the size of its hardware is reduced.

A comparator 618 generates a selection control signal by comparing the input luminance signal $X_k$ with the mean level $X_m$ output by the frame mean calculator 610. A selector 620 selects the first mapper 614 when the input luminance signal $X_k$ is smaller than or equal to the mean level $X_m$, and otherwise, selects the second mapper 616, according to the selection control signal, thereby outputting a contrast-enhanced signal capable of being expressed by Equation (11), i.e., an adjusted luminance signal Y'.

Here, the frame histogram calculator 604 and the CDF calculator 606 need not be formed separately, and can be constituted as one block for calculating a gray level distribution with respect to the quantized image $Z_q$'s in a screen unit and calculating the CDF of the quantized image $Z_q$'s on the basis of the result.

Figure 12:
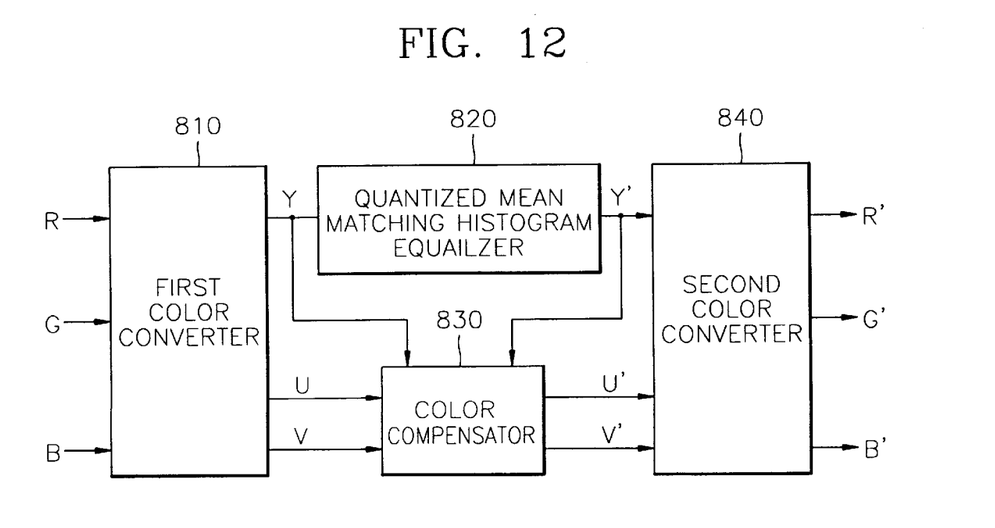
FIG. 12 is a block diagram of an image enhancement circuit according to still yet another embodiment of the present invention.

FIG. 12 is a block diagram of an image enhancement circuit according to another embodiment of the present invention. Referring to FIG. 12, a first color converter 810 receives base-band digital color signals indicated by R, G and B and converts a digital luminance signal into system-defined color signals which are indicated by Y, U and V.

A quantized mean matching histogram equalizer 820 histogram-equalizes a quantized cumulative density function of the luminance signal Y output by the first color converter 810 using an interpolated cumulative density function as a transform function, and outputs a varied luminance signal Y' by controlling the transform function to map a mean level of the input luminance image to itself. Here, the detailed configuration of the quantized mean matching histogram equalizer 820 is the same as that of the equalizer shown in FIG. 11.

A color compensator 830 receives the luminance signal (Y) output by the first color converter 810 and the varied luminance signal Y' output by the quantized mean matching histogram equalizer 820, varies the system-defined color signals U and V output by the first color converter 810 so that the color signals U and V are varied in the same ratio as the variation of the luminance signal, and outputs compensated system-defined color signals U' and V'. Here, the color compensator 830 may output system-defined color signals U' and V' compensated using the configuration shown in FIGS. 7 and 8.

A second color converter 840 receives the adjusted luminance signal Y' output by the quantized mean matching histogram equalizer 820 and the signals U' and V' output by the color compensator 830, performs an inverse conversion opposite to the conversion performed by the first color converter 810, and outputs resultant color signals R', G' and B'.

The present invention is applicable to wide-ranging fields associated with image enhancement of an image signal, such as broadcasting radar, signal processing, medical engineering, home appliances, etc.

As described above, when histogram equalization is performed using a cumulative density function of a luminance image as a transform function, the present invention controls the transform function to map a mean level of the luminance signal to itself, thereby enhancing image contrast. Also, the present invention changes a color signal on the basis of the luminance signal varied by contrast enhancement, so that an undistorted color signal is provided.

Also, when histogram equalization is performed on a quantized cumulative density function of an input luminance image using an interpolated cumulative density function as a transform function, the present invention controls the transform function to map a mean level of the input luminance image to itself, thereby effectively reducing an abrupt variation in brightness and an artifact which occur during histogram equalization according to the prior art. Thus, image contrast is improved, and an undistorted color signal is provided.

Furthermore, a circuit according to the present invention stores and accumulates only the number of times of generation of a quantized gray level, so that its hardware is simplified and its cost is thus reduced.

What is claimed is:

1. An image enhancement method comprising the steps of:
   (a) extracting a luminance signal from input color signals;
   (b) performing histogram equalization using a cumulative density function of said extracted luminance signal as a transform function, and outputting an adjusted luminance signal by controlling said transform function to map a mean level of said extracted luminance signal to itself; and
   (c) varying said input color signals based on said adjusted luminance signal, and outputting compensated color signals.

2. An image enhancement method as claimed in claim 1, wherein said compensated color signals are varied in an identical direction to that of said input color signal, wherein said extracted luminance signal describes a first plane and the adjusted luminance signal describes a second plane and the identical direction is described by a directional change from said first plane to said second plane.

3. An image enhancement method as claimed in claim 1, wherein said adjusted luminance signal forms an adjusted luminance plane in a space of said input color signals, and wherein the luminance values of all color signals on said adjusted luminance plane are the same.

4. An image enhancement method as claimed in claim 3, wherein said compensated color signals are obtained by an intersection point between a) a compensation line, said compensation line being extended in a direction of a line of said input color signals, and b) said adjusted luminance plane.

5. An image enhancement method as claimed in claim 4, wherein, when a ratio between said extracted luminance signal and said adjusted luminance signal is expressed as a factor of k, said compensation line is expressed as follows:

$$(R', G', B') = k(R,G,B)$$

where (R,G,B) represents said input color signals and where (R', G', B') represents said compensated color signals.

6. An image enhancement method as claimed in claim 4, wherein, when a ratio between said extracted luminance signal and said adjusted luminance signal is expressed as a factor of k, said compensation line is expressed as follows:

$$(R', G', B') = A(R,G,B) + K$$

where (R,G,B) represents said input color signals and where (R', G', B') represents said compensated color signals, wherein A is $$\frac{k(1-\alpha)}{k-1},$$

K is $$\frac{(k-1)\alpha}{k-1} Max,$$

α is greater than or equal to 0 and smaller than or equal to 1, and Max denotes a maximum value of a color signal.

7. An image enhancement method as claimed in claim 1, wherein said step (b) comprises:
   (b1) calculating said cumulative density function of said extracted luminance signal, said extracted luminance signal being provided in screen units,
   (b2) calculating said mean level of said extracted luminance signal; and
   (b3) transforming a gray level of said extracted luminance signal using said calculated cumulative density function as said transform function, and outputting said adjusted luminance signal by controlling said transform function so that said mean level is mapped to itself.

8. An image enhancement method as claimed in claim 1, wherein said step (b) comprises:
   (b1) quantizing gray levels of said extracted luminance signal, said extracted luminance signal being provided in screen units, and outputting a quantized signal;
   (b2) calculating a cumulative density function based on a gray level distribution of said quantized signal, and outputting a quantized cumulative density function;
   (b3) calculating a mean level of gray levels of said extracted luminance signal in a screen unit; and
   (b4) outputting an interpolated cumulative density function value obtained by an interpolation of said quantized cumulative density function and a cumulative density function value with respect to said mean gray level;

(b5) mapping said extracted luminance signal to an adjusted gray level according to said interpolated cumulative density function value corresponding to said extracted luminance signal and said cumulative density function value with respect to said mean gray level, using said interpolated cumulative density function as said transform function, and outputting said adjusted luminance signal by controlling said transform function so that said mean gray level obtained in step (b3) is mapped to itself.

9. An image enhancement method as claimed in claim 8, wherein said interpolation in step (b4) is a linear interpolation.

10. An image enhancement circuit comprising:

extracting means for extracting a luminance signal from input color signals;

histogram equalizing means for performing histogram equalization using a cumulative density function of said extracted luminance signal as a transform function, and outputting an adjusted luminance signal by controlling said transform function to map a mean level of said extracted luminance signal to itself; and color compensating means for outputting compensated color signals by varying said input color signals based on said adjusted luminance signal.

11. An image enhancement circuit as claimed in claim 10, wherein said color compensating means comprises:

an operator for producing a ratio between said extracted luminance signal and said adjusted luminance signal; and a plurality of multipliers for multiplying the ratio output by said operator with each input color signal and outputting compensated color signals.

12. An image enhancement circuit as claimed in claim 10, wherein said color compensating means comprises:

an operator for producing a ratio between said extracted luminance signal and said adjusted luminance signal; and a plurality of controllers for receiving the ratio output by said operator and a parameter ($\alpha$), for varying the value of each input color signal using a compensation line based on said parameter, and outputting said compensated color signals.

13. An image enhancement circuit as claimed in claim 12, wherein, when a ratio between said extracted luminance signal and said adjusted luminance signal is expressed as a factor of given as k, said compensation line is expressed as follows:

(R', G', B')=k(R,G,B)

where (R,G,B) represents said input color signals and where (R', G', B') represents said compensated color signals.

14. An image enhancement circuit as claimed in claim 12, wherein, when a ratio between said extracted luminance signal and said adjusted luminance signal is expressed as a factor of k, said compensation line is expressed as follows:

(R', G', B')=A(R,G,B)+K where (R,G,B) represents said input color signals and where (R', G', B') represents said compensated color signals, wherein A is $$\frac{k(1-\alpha)}{k-1},$$

K is $$\frac{(k-1)\alpha}{k-1}Max,$$

$\alpha$ is greater than or equal to 0 and smaller than or equal to 1, and Max denotes a maximum value of a color signal.

15. An image enhancement circuit as claimed in claim 10, wherein said histogram equalizing means comprises:

a first calculator for calculating said mean level of said extracted luminance signal input in a screen unit;

a second calculator for calculating said cumulative density function based on a gray level distribution of a screen unit of said extracted luminance signal; and a mapper for mapping said extracted luminance signal to an adjusted gray level according to a cumulative density function value corresponding to said extracted luminance signal and a cumulative density function value with respect to said mean level, and outputting said adjusted luminance signal by mapping said mean level to itself.

16. An image enhancement circuit as claimed in claim 15, wherein said second calculator comprises:

a frame histogram calculator for calculating a gray level distribution of said extracted luminance signal input in a screen unit; and a cumulative density function calculator for calculating said cumulative density function based the calculated gray level distribution and outputting said cumulative density function value corresponding to said extracted luminance signal.

17. An image enhancement circuit as claimed in claim 15, wherein said histogram equalizing means further comprises a buffer for renewing said cumulative density function value calculated by said second calculator, and supplying to said mapper a cumulative density function value corresponding to said extracted luminance signal previously stored and said cumulative density function value with respect to said mean level during renewal.

18. An image enhancement circuit as claimed in claim 15, wherein said histogram equalizing means further comprises a screen memory for delaying said extracted luminance signal by a screen unit to input a luminance signal having the same frame as that of said cumulative density function calculated by said second calculator, to said mapper.

19. An image enhancement circuit as claimed in claim 15, wherein said mapper comprises:

a first mapper for mapping said mean level calculated by said first calculator to itself by controlling said cumulative density function as said transform function, and for mapping said extracted luminance signal having a level smaller than said mean level to an adjusted gray level having a first range, according to said cumulative density function value corresponding to said extracted luminance signal and said cumulative density function value with respect to said mean level;

a second mapper for mapping said extracted luminance signal having a level greater than said mean level to an adjusted gray level having a second range, according to said cumulative density function value corresponding to said extracted luminance signal and said cumulative density function value with respect to said mean level;

a comparator for outputting a selection control signal by comparing said extracted luminance signal with said mean level; and a selector for selecting said first mapper when said extracted luminance signal is smaller than or equal to said mean level, and otherwise, selecting said second mapper, according to said selection control signal.

20. An image enhancement circuit as claimed in claim 18, wherein said mapper comprises:

a first mapper for mapping said mean level calculated by said first calculator to itself by controlling said cumulative density function as said transform function, and for mapping said luminance signal having a level smaller than said mean level, output by said screen memory, to an adjusted gray level having a first range, according to said cumulative density function value corresponding to said extracted luminance signal and to said cumulative density function value with respect to said mean level;

a second mapper for mapping said luminance signal, output by said screen memory, having a level greater than said mean level to an adjusted gray level having a second range, according to said cumulative density function value corresponding to said extracted luminance signal and said cumulative density function value with respect to said mean level;

a comparator for outputting a selection control signal by comparing said luminance signal output by said screen memory with said mean level; and a selector for selecting said first mapper when said luminance signal output by said screen memory is smaller than or equal to said mean level, and otherwise, selecting said second mapper, according to said selection control signal.

21. An image enhancement circuit as claimed in claim 10, wherein said histogram equalizing means comprises:

a quantizer for quantizing a level of said extracted luminance signal and outputting a quantized signal;

a first calculator for calculating a cumulative density function based on a gray level distribution of a screen unit with respect to said quantized signal and outputting a quantized cumulative density function value;

a second calculator for calculating a mean level of said extracted luminance signal in a screen unit;

an interpolator for interpolating said quantized cumulative density function value by a interpolation and outputting an interpolated cumulative density function value; and a mapper for mapping said extracted luminance signal to an adjusted gray level using said interpolated cumulative density function as said transform function, and outputting said adjusted luminance signal by controlling said transform function to map said mean level obtained by said second calculator to itself.

22. An image enhancement circuit as claimed in claim 21, wherein said first calculator comprises:

a frame histogram calculator for calculating said gray level distribution of said quantized signal in a screen unit; and a cumulative density function calculator for calculating said cumulative density function based on the calculated gray level distribution of said quantized signal and outputting quantized cumulative density function value.

23. An image enhancement circuit as claimed in claim 21, wherein said interpolation corresponds to a linear interpolation.

24. An image enhancement circuit as claimed in claim 21, wherein said circuit further comprises a buffer for renewing said interpolated cumulative density function value and outputting an interpolated cumulative density function value corresponding to said extracted luminance signal previously stored and said cumulative density function value with respect to said mean level during renewal.

25. An image enhancement circuit as claimed in claim 21, wherein said circuit further comprises a screen memory for delaying said extracted luminance signal by a screen unit to input a luminance signal having the same frame as that of said interpolated cumulative density function value to said mapper.

26. An image enhancement circuit as claimed in claim 21, wherein said mapper comprises:

a first mapper for mapping said mean level calculated by said second calculator to itself, and for mapping said extracted luminance signal having a level smaller than or equal to said mean level to an adjusted gray level having a first range, according to said interpolated cumulative density function value corresponding to said extracted luminance signal and a cumulative density function value with respect to said mean level;

a second mapper for mapping said extracted luminance signal having a level greater than said mean level to a gray level having a second range, according to said interpolated cumulative density function value corresponding to said extracted luminance signal and said cumulative density function value with respect to said mean level;

a comparator for outputting a selection control signal by comparing said extracted luminance signal with said mean level; and a selector for selecting said first mapper when said extracted luminance signal is smaller than or equal to said mean level, and otherwise, selecting said second mapper, according to said selection control signal.

27. An image enhancement circuit as claimed in claim 25, wherein said mapper comprises:

a first mapper for mapping said mean level calculated by said second calculator to itself, and for mapping said extracted luminance signal having a level smaller than or equal to said mean level, output by said screen memory, to an adjusted gray level having a first range, according to said interpolated cumulative density function value corresponding to said luminance signal and a cumulative density function value with respect to said mean level;

a second mapper for mapping said extracted luminance signal, output by said screen memory, having a level greater than said mean level to a gray level having a second range, according to said interpolated cumulative density function value corresponding to said luminance signal and said cumulative density function value with respect to said mean level;

a comparator for outputting a selection control signal by comparing said luminance signal output by said screen memory with said mean level; and a selector for selecting said first mapper when said luminance signal output by said screen memory is smaller than or equal to said mean level, and otherwise, selecting said second mapper, according to said selection control signal.

* * * * *